Sept. 18, 1951  J. J. NAUGLE  2,568,085
FILTERING DEVICE
Filed Oct. 10, 1947  2 Sheets-Sheet 1
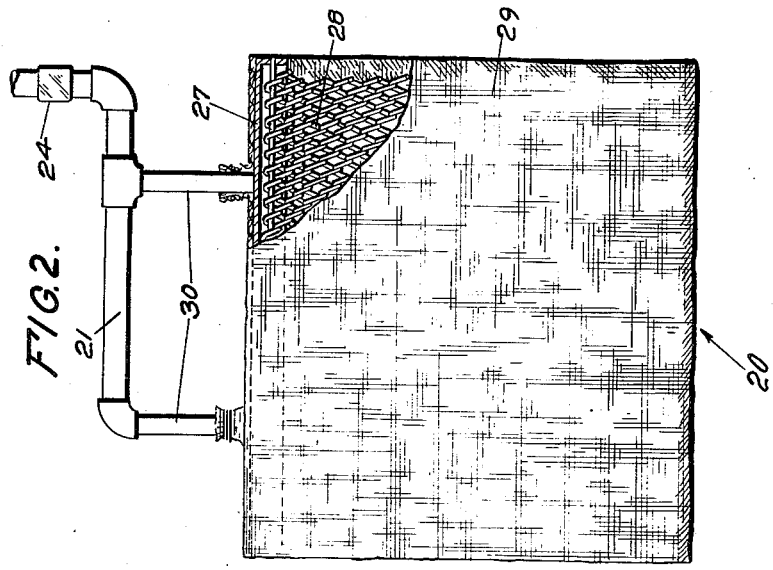
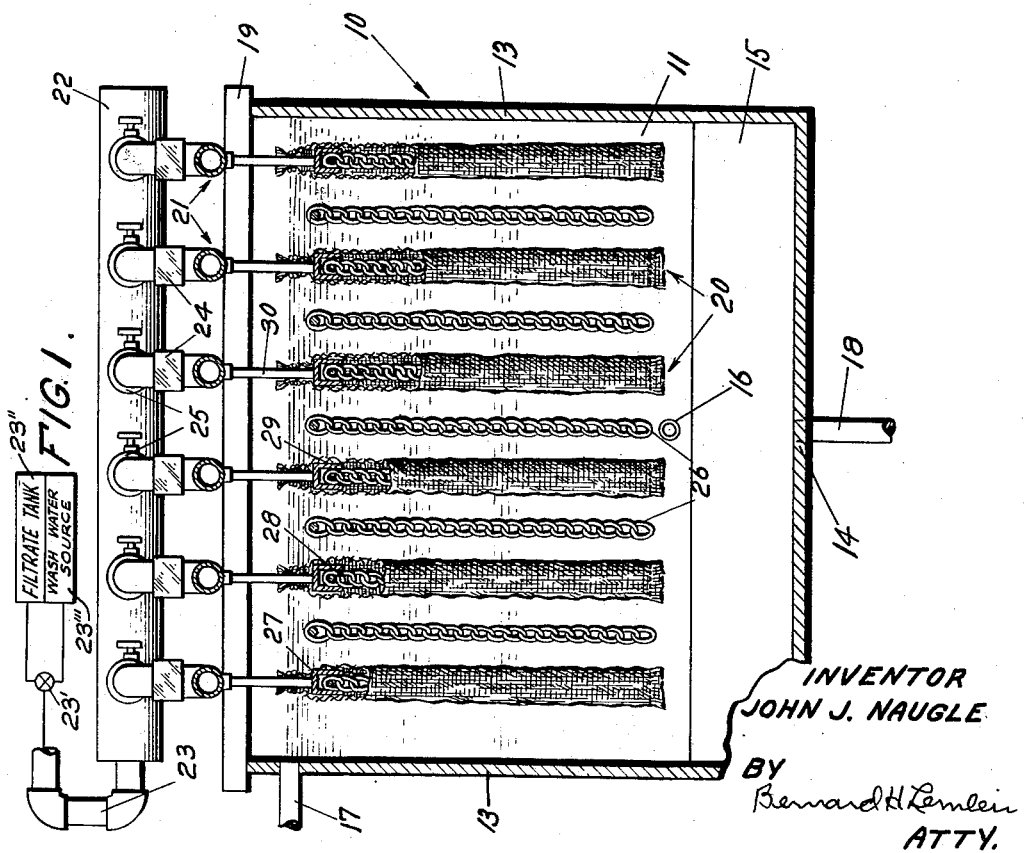
INVENTOR
JOHN J. NAUGLE
BY
Bernard H Lemlein
ATTY.

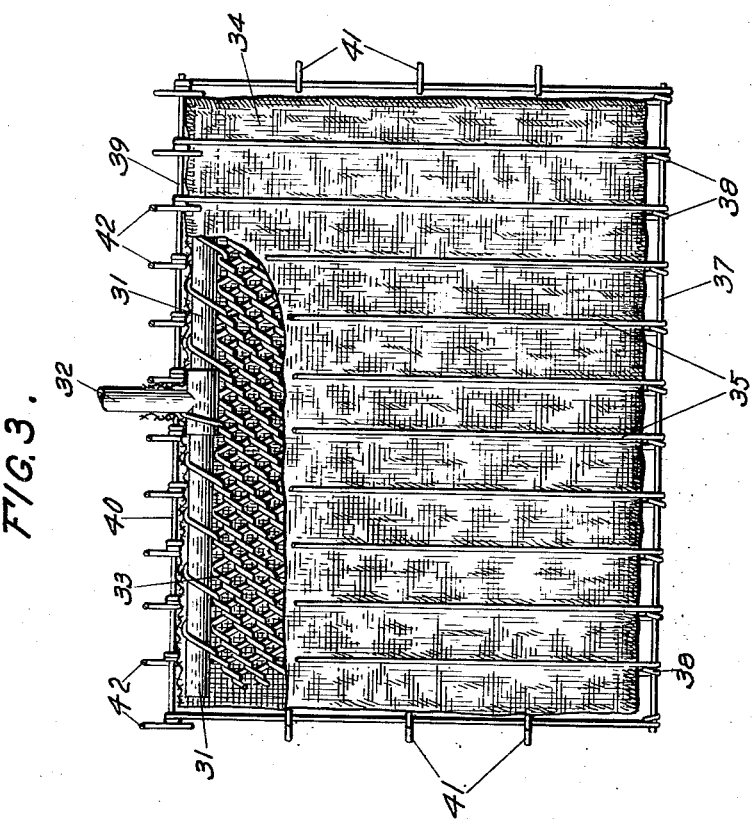

Patented Sept. 18, 1951

2,568,085

UNITED STATES PATENT OFFICE 2,568,085

FILTERING DEVICE

John J. Naugle, New York, N. Y.

Application October 10, 1947, Serial No. 779,039

1 Claim. (Cl. 210—182)

This invention relates to filtering apparatus and filter leaves therefor, the construction of said apparatus and leaves being such as to enable the rapid removal of said leaves from said apparatus without interfering with the continuous operation of said apparatus, and said leaves being so designed as to enable the speedy removal therefrom of the filter cake deposited thereon during the filtering operation.

In the accompanying specification there shall be described, and in the annexed drawings shown, two illustrative embodiments of the filtering apparatus and leaves of the present invention. It is, however, to be clearly understood that the present invention is not to be limited to the aforesaid illustrative embodiments inasmuch as changes therein may be made without the exercise of invention and within the true spirit and scope of the claim hereto appended.

In said drawings, Fig. 1 is a partially longitudinal sectional, partially front elevational view of one form of filtering apparatus incorporating the present invention;

Fig. 2 is a side elevational view of one form of filter leaf which may be used in the apparatus of Fig. 1, said leaf being partially broken away to show the internal construction;

Fig. 3 is a similar view of a modified form of filter leaf made in accordance with the present invention; and Fig. 4 is an edge view of the same.

Referring now more in detail to the filtering apparatus and leaves of the present invention, with particular reference to the form thereof shown in Figs. 1 and 2 of the drawings, the numeral 10 generally designates a tank including a short rear wall 11 and a longer front wall (not shown), side walls 13, and a bottom wall comprising a flat, forward portion 14 and a rear, sloping portion 15.

Adjacent the lower edge of the rear wall 11, the tank 10 is provided with an inlet pipe 16 by means of which liquid to be filtered for example, a sugar juice, syrup or melt, may be continuously conveyed from suitable storage facilities (not shown) to said tank. Adjacent the upper edge of said rear wall 11, said tank is provided with an overflow pipe 17 which may be connected back to the aforesaid liquid storage facilities, and the flat, forward portion 14 of the bottom wall of said tank is provided with a conduit 18 by means of which filter cake and other sludge collecting at the bottom of the tank may be continuously removed.

Suspended in the tank 10, as by resting upon a pair of bars 19, in turn, resting upon the upper edges of the walls 13 of said tank, is a plurality of filter leaves generally designated by the reference character 20, each leaf communicating, as will hereinafter be described, with an auxiliary conduit 21 removably coupled to a main conduit 22 adapted to communicate, through piping 23 which includes an appropriate valve 23', with suitable filtrate storage facilities and a suitable source of wash water, for example, tanks 23" and 23'''. Each auxiliary conduit 21 includes a sight glass 24 enabling observation of the filtrate flowing from the leaf with which it is associated, and a valve 25 to control the flow of said filtrate to the main conduit 22.

Also suspended in the tank 10, intermediate the filter leaves 20, is a plurality of scrubbing members 26, each consisting of a flexible mat or grid formed of wire coils interengaged along horizontal parallel lines disposed in a single vertical plane, the arrangement being such that during the washing of the filter leaves, as will hereinafter be described, said filter leaves are urged into scrubbing contact with the members 26 whereby the filter cake deposited on said filter leaves during the filtering operation is removed therefrom and drops to the bottom of the tank from whence it may be removed through the conduit 18.

Each filter leaf 20 comprises a supporting member 27, for example, an inverted channel bar, from which is suspended a foraminate structure, for example, flexible grid or mat 28 consisting, like the scrubbing members 26, of a plurality of wire coils interengaged along horizontal parallel lines disposed in a single vertical plane. The supporting member 27 and grid 28 are enclosed in a filter bag 29 the interior of which communicates, through outlet pipes 30 passing through the supporting member and filter bag, with the auxiliary conduit 21.

In use, liquid to be filtered is conveyed to the tank 10 through the inlet pipe 16, and the pipe 23 is connected to a vacuum pump. Upon the application of vacuum, liquid passes to the interior of the leaves through the filter bags 29 from whence clear liquid is conveyed through the pipes 30, 21 and 22 to appropriate filtrate storage facilities, for example, the tank 23". Should observation of the filtrate through the glasses 24 reveal any particular leaf 20 to be functioning improperly, the valve 25 associated with the defective leaf may be closed and said defective leaf may be removed from the apparatus and be replaced by a fresh one without interfering with the continuous operation of the apparatus.

When it is desired to clean the leaves 20, the pipe 23 is disconnected from the vacuum pump and connected to a source of wash water, for example, the tank 23''' by the valve arrangement referred to in earlier portions of this specification, the wash water being forced, under pressure, through the apparatus in a reverse direction to the flow of filtrate, whereby the filter bags are urged into scrubbing contact with the members 26 to remove from the exterior surfaces thereof the filter cake deposited thereon during the filtering operation. The cake drops to the lower, forward portion of the tank 10 from whence it may be removed through the pipe 18.

Reference is now made to Figs. 3 and 4 of the drawings for a description of the modified form of filter leaf of the present invention. As there shown, said leaf comprises a supporting pipe 31 closed at its ends and coupled at its center with a filtrate outlet and wash water inlet pipe 32, said last-named pipe communicating, as in the form of leaf shown in Figs. 1 and 2, through auxiliary and main conduits, with appropriate storage facilities and a suitable source of wash water.

Suspended from the pipe 32 is a flexible grid 33 which may be similar to the grid 28 of the leaf 20, and enclosing the pipe 32 and grid 33 is a filter bag 34.

With the type of filter leaf now under consideration, scrubbing members 26 may or may not be used. If not, the leaves may be enclosed in wire frames consisting of integrally formed, front and rear vertical members 35 and 36 the lower ends of which are wrapped about a horizontally disposed rod 37, as at 38, the upper ends of said front and rear members being wrapped, respectively, about horizontally disposed rods 39 and 40. In order to give greater rigidity to the frame, the end vertical members may be connected by horizontally disposed, short lengths 41 of wire, and in order to secure the frames in position over the leaves, the upper horizontally disposed rods 39 and 40 may be similarly connected by short lengths 42 of wire fixedly secured about the rear rod 40 and removably engaged over the front rod 39.

When the wire frames just described are employed in place of the scrubbing members 26, the filter bags are urged into scrubbing contact with said wire frames during the reverse flow of the wash water, thereby removing the filter cake deposited on said filter bags during the previous filtering operations.

This completes the description of the aforesaid illustrative embodiments of the filtering apparatus and filter leaves of the present invention. It will be noted from all of the foregoing that by means of the present invention individual filter leaves may easily and rapidly be replaced, if found defective, without interfering with the continuous operation of the apparatus as a whole, and the filter cake deposited upon said leaves may readily be removed therefrom by flushing said leaves with wash water in the reverse direction to the filtrate flow.

What is claimed is:

Filtering apparatus comprising: a tank; a plurality of filter leaves; means for suspending said filter leaves in said tank; each of said filter leaves including a flexible internal structure and a porous bag enclosing the same; a plurality of scrubbing elements; means for suspending said scrubbing elements in said tank intermediate said filter leaves; a filtrate storage tank and a source of washing liquid; a main conduit selectively communicating with said filtrate storage tank and said source of washing liquid; and a plurality of auxiliary conduits removably coupled to said main conduit and communicating, respectively, with the interior of each of said filter leaves, whereby when said main conduit is communicating with said filtrate storage tank, filtrate from the interior of said filter leaves flows in one direction through said auxiliary and main conduits to said storage tank, and when said main conduit is communicating with said source of washing liquid, washing liquid flows in the opposite direction through said main and auxiliary conduits to the interior of said filter leaves to urge the porous bags thereof into contact with said scrubbing elements.

JOHN J. NAUGLE.

REFERENCES CITED

The following references are of record in the file of this patent:

UNITED STATES PATENTS

| Number | Name | Date |
|---|---|---|
| 517,966 | Spalding | Apr. 10, 1894 |
| 579,769 | Pich | Mar. 30, 1897 |
| 607,952 | Proks | July 26, 1898 |
| 1,250,275 | Brown | Dec. 18, 1917 |
| 1,693,717 | Lienesch | Dec. 4, 1928 |
| 1,696,735 | Scoville | Dec. 25, 1928 |
| 1,724,436 | Sweetland | Aug. 13, 1929 |
| 2,013,776 | Wiesman | Sept. 10, 1935 |
| 2,023,910 | Bacheldor | Dec. 10, 1935 |
| 2,031,107 | Hopper | Feb. 18, 1936 |
| 2,079,366 | Thomas | May 4, 1937 |
| 2,200,899 | Scheidt | May 14, 1940 |
| 2,255,937 | McNamara | Sept. 16, 1941 |

FOREIGN PATENTS

| Number | Country | Date |
|---|---|---|
| 626,321 | France | May 9, 1927 |
| 635,462 | France | Dec. 28, 1927 |
| 312,157 | Italy | Oct. 25, 1933 |